Figure 1:
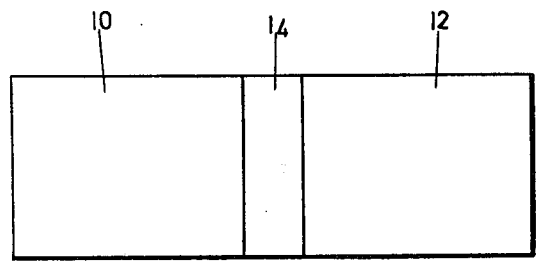

United States Patent [19]

Vermeulen

[11] 4,045,674
[45] Aug. 30, 1977

[54] DIAMONDS

[76] Inventor: Leon Ampeir Vermeulen, 24, Ferreira Street, Discovery, Transvaal, South Africa

[21] Appl. No.: 636,144

[22] Filed: Nov. 28, 1975

[30] Foreign Application Priority Data

Dec. 4, 1974 South Africa .................. 74/7725

[51] Int. Cl.² .................................................. G01T 1/22
[52] U.S. Cl. .................................. 250/370; 250/371; 250/492 R
[58] Field of Search ............... 250/492 R, 492 B, 370, 250/371; 204/157.1 R

[56] References Cited

U.S. PATENT DOCUMENTS

| 2,678,400 | 5/1954 | McKay | 250/370 |
| 2,760,078 | 8/1956 | Youmans | 250/370 |
| 2,806,145 | 9/1957 | Cotty | 250/370 |

Primary Examiner—Craig E. Church

[57] ABSTRACT

The invention is founded on the discovery that type IIb diamond which has been rendered electrically non-conductive by being subjected to radiation capable of inducing atomic displacements becomes electrically conductive again when subjected to ionizing radiation. The invention thus provides a method of causing an electrical current to flow through a body of type IIb diamond which has been subjected to radiation capable of inducing atomic displacements by applying an electrical potential across the body and exposing the body to ionizing radiation while maintaining an electrical potential across the body. The invention also provides a novel diamond consisting of a type IIb diamond having only a portion which has been subjected to radiation capable of inducing atomic displacements.

11 Claims, 2 Drawing Figures

DIAMONDS

This invention relates to diamonds of the type IIb.

Four basic types of diamond particles are known. These types are named type Ia, Ib, IIa and IIb. Types Ia, Ib and IIa are all insulating or electrically non-conducting whereas type IIb is semi-conducting. Type Ia diamonds have nitrogen aggregates dispersed through the lattice. Type Ib diamonds have substitutional nitrogen in the lattice. Type IIa diamonds have no detectable nitrogen. Type IIb diamonds have substitutional boron atoms in the lattice and are p-type semi-conductors.

This invention concerns only diamonds of the type IIb which may be of synthetic or natural origin. In the case of synthetic diamonds the particles will be substantially free of metal inclusions as the invention involves exposing the particles to irradiation.

It is known that diamonds of the type IIb can be made electrically non-conductive by subjecting them to irradiation capable of inducing atomic displacements. The irradiation will generally be high energy electron bombardment radiation of energy greater than 0.3 MeV. The dosage or flux of the irradiation will vary according to the degree of atomic displacements desired and the energy of the radiation. In general, the flux will be such as to cause at least $10^{17}$ atomic displacements per cubic centimeter in the diamond.

It has now been discovered, and this discovery forms the basis of the present invention, that diamonds of the type IIb which have been made electrically non-conductive can be made electrically conductive by exposing them to ionising radiation.

As long as the diamonds are exposed to the ionising radiation they are electrically conducting. As soon as the exposure is stopped, the diamonds revert to their non-conducting state. Consequently, when an electrical potential is applied across such a diamond the current passing through the diamond will vary according to the intensity of the ionising radiation to which the diamond is exposed.

The invention thus provides, according to one aspect, a method of causing an electrical current to flow through a body of type IIb diamond which has been subjected to radiation capable of inducing atomic displacements, including the steps of applying an electrical potential across the body and exposing the body to ionising radiation while maintaining an electrical potential across the body.

The ionising radiation may be $\alpha$, $\beta$, $\gamma$ or X-radiation. The ionising radiation may also be light of wavelength in the range 10,000 A to 2,200 A.

The invention may be utilised in many ways and has particular application to the detection of ionising radiation. The detection can take the form of ascertaining the existence of ionising radiation or of counting ionising radiation or of performing a switching function. The term "detect" as used herein and in the claims covers all such forms. Thus, according to another aspect, the invention provides a method of detecting ionising radiation including the steps of applying an electrical potential across a body of type IIb diamond which has been subjected to radiation capable of inducing atomic displacements, exposing the body to ionising radiation while maintaining an electrical potential across the body and monitoring the electrical current passing through the body. Monitoring of the electrical current passing through the body of diamond may be achieved using any suitable means known in the art.

The body of diamond may be provided by an entire diamond particle. It is preferable however, that the body of diamond be provided by only a portion of the diamond particle. The portion may take the form of a band which preferably has a narrow width. The width of the band conveniently does not exceed 1 mm in width.

The body is preferably a narrow body and the electrical potential preferably applied across a narrow section of the body. Thus, for example, the body may take the form of a thin rectangular block in which case the electrical potential will preferably be applied across a side of the block.

A diamond having both conducting and non-conducting portions may be produced by suitably masking the diamond so only the face or faces of that zone or portion on the particle which it is desired to render non-conductive is exposed. Masking may be by way of any suitable metal such as lead. The masked diamond particle is then exposed to radiation capable of inducing atomic displacements at a flux sufficient to render the exposed portion electrically non-conductive. Depending on the energy of irradiation, it may be necessary to expose more than one face of the zone desired to be rendered non-conductive to achieve the desired result. The masking is then removed leaving a diamond particle having a portion electrically conducting and a portion electrically non-conducting. When the particle is exposed to ionising radiation the particle as a whole becomes electrically conducting and this condition is maintained as long as the exposure to the irradiation is maintained.

The invention provides according to yet another aspect, a variable resistance element comprising a body of diamond which has been subjected to radiation capable of inducing atomic displacements so mounted between a pair of electrodes that an electrical potential can be applied across it and adapted to be exposed to ionising radiation. The mounting of the diamond particle between the pair of electrodes may be achieved by means and methods known in the art. The electrical current which passes through the element will vary according to the intensity of ionising radiation to which it is exposed and the ambient temperature.

The body is preferably a narrow body with the mounting between the electrodes being such that the electrical potential can be applied across a narrow section thereof. The narrower the section the greater the electric field across the section for a given applied potential. The effect will be to increase the speed of response and sensitivity of the element.

The body is preferably only a portion of a diamond particle which portion extends over the entire current flowing path between the electrodes thereby preventing short-circuiting. The portion may take the form of a band as described above.

Figure 2:
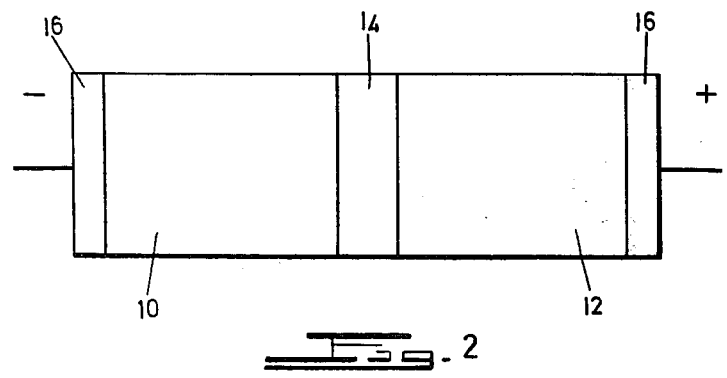

An embodiment of the invention will now be described with reference to the accompanying drawing in which FIG. 1 shows a diamond particle of the invention and FIG. 2 shows the diamond particle mounted between a pair of electrodes. Both figures are diagrammatic.

A type IIb diamond particle was cut to rectangular shape. The cut diamond was then masked with lead covering to expose only a narrow band in the centre of the diamond. The band had a width of 1 mm. The masked diamond was then exposed to electron bombardment radiation of energy 2 MeV. The flux was $10^{17}$ to $10^{18}$ electrons/sq. cm. and this induced $10^{17}$ to $10^{18}$ atomic displacements per cubic centimeter in the exposed band of the diamond. The masking was then removed. The resulting diamond was as illustrated in FIG. 1. The diamond had end zones 10, 12 which were electrically conducting. The diamond also had a centre band 14 which was electrically non-conducting and had a deep blue colour. The diamond as a whole was a sensitive photoconductor as when it was exposed to ionising radiation it became, as a whole, electrically conducting.

The diamond particle was clamped between a pair of electrodes 16 as illustrated by FIG. 2. The mounting of the diamond was such that the band 14 lay intermediate the electrodes 16. An electrical potential of 300 volts was applied across the electrodes in the absence of any detectable ionising radiation. The resistance of the diamond was found to be very high and of the order of $6 \times 10^{17}$ ohms. The diamond was then exposed to intense white light and the same voltage applied across the electrodes. An electric current of 0.1 μA was found to pass through the diamond as long as the exposure to the white light was maintained. As soon as the exposure to white light was stopped, the resistance reverted to its previous high value.

It is to be noted that the band extends over the entire current flowing path thereby preventing any short circuiting.

The illustrated embodiment shows the band positioned in the middle of the particle. The band can just as effectively be placed at any other point intermediate the ends or at either end.

The diamond of the invention may be used for detecting light or charged particles or any other ionising radiation. It has many advantages over other semi-conducting diamond particles and germanium and silicon semiconductors. As regards other semi-conducting diamonds, it has the advantage of a much higher signal to noise ratio. As regards germanium and silicon semiconductors it has the advantages that it does not rely on junctions and that it can be operated successfully at higher temperatures than can such semiconductors.

I claim:

1. A method of causing an electrical current to flow through a body of type IIb diamond which has been subjected to radiation so as to cause atomic displacements, including the steps of applying an electrical potential across the body and exposing the body to ionizing radiation while maintaining an electrical potential across the body.

2. A method of causing an electrical current to flow through a body of type IIb diamond which has been subjected to electron bombardment radiation of energy greater than 0.3 MeV so as to cause atomic displacements, including the steps of applying an electrical potential across the body and exposing the body to ionizing radiation while maintaining an electrical potential across the body.

3. A method of detecting ionizing radiation including the steps of applying an electrical potential across a body of type IIb diamond which has been subjected to radiation so as to cause atomic displacements, exposing the body to ionizing radiation while maintaining an electrical potential across the body and monitoring the electrical current passing through the body.

4. A method as in claim 3, wherein the radiation is an electron bombardment of energy greater than 0.3 MeV.

5. A method of detecting ionizing radiation including the steps of applying an electrical potential across a body of type IIb diamond which has been subjected to electron bombardment radiation of energy greater than 0.3 MeV so as to cause atomic displacements, exposing the body to ionizing radiation while maintaining an electrical potential across the body and monitoring the electrical current passing through the body.

6. A variable resistance element comprising a body of type IIb which has been subjected to radiation so as to cause atomic displacements so mounted between a pair of electrodes that an electrical potential can be applied across it and adapted to be exposed to ionizing radiation.

7. A variable resistance element as in claim 6, wherein the radiation causing atomic displacements is an electron bombardment of energy greater than 0.3 MeV.

8. An element according to claim 7 in which the body is a narrow body and is so mounted between the electrodes that the electrical potential can be applied across a narrow section thereof.

9. An element according to claim 8 wherein the body is a portion of a diamond particle and extends over the entire current flowing path between the electrodes.

10. An element according to claim 9 wherein the portion is a band and the diamond particle is so mounted between the electrodes that an electrical potential can be applied across its width.

11. An element according to claim 10 wherein the width of the band does not exceed 1 mm.

* * * * *